No. 823,187. PATENTED JUNE 12, 1906.
B. F. McFARLAND & C. E. CROSBY.
MECHANICAL ADVERTISER.
APPLICATION FILED AUG. 28, 1905.
4 SHEETS—SHEET 1.
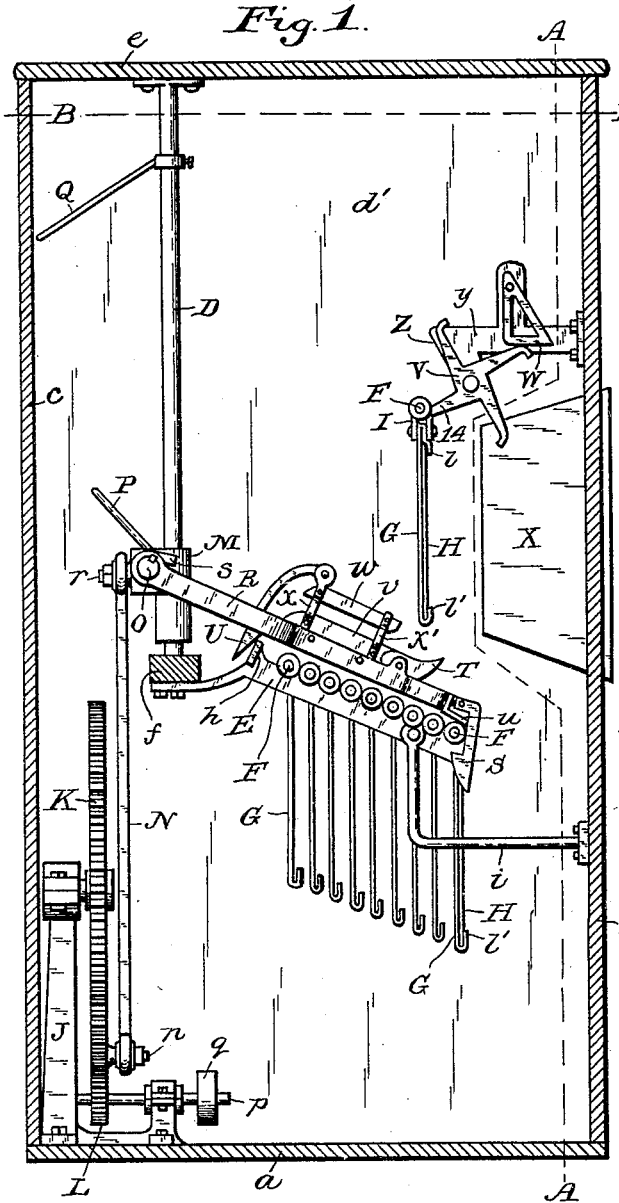
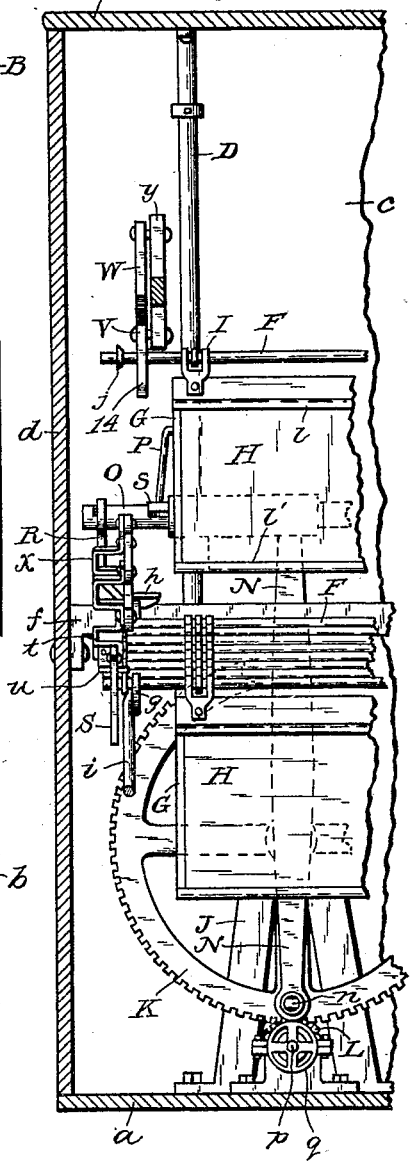
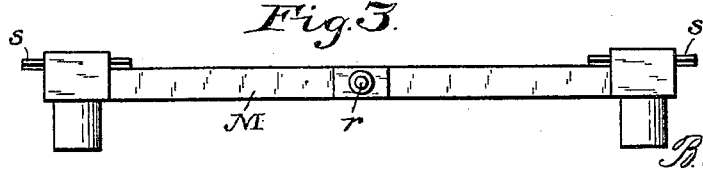
Witnesses:
B. L. Boyle.
Stella Snider.
Inventors:
B. F. McFarland.
C. E. Crosby.
by E. T. Silvius,
Attorney.

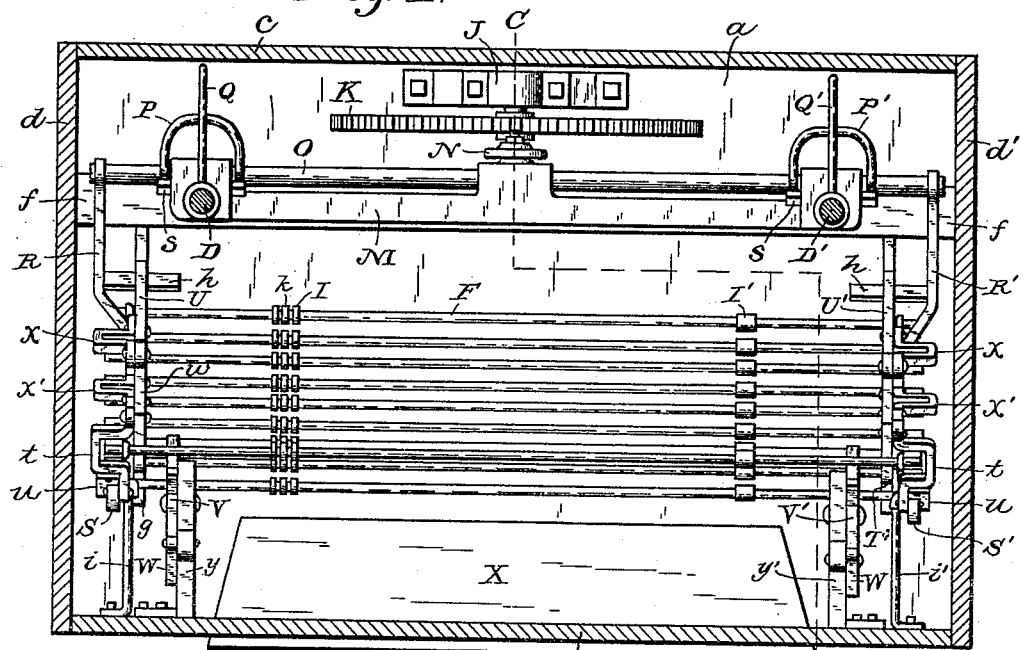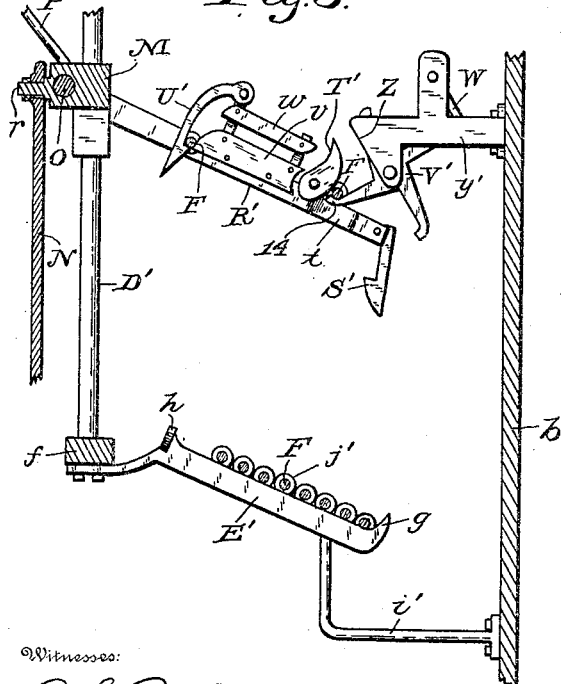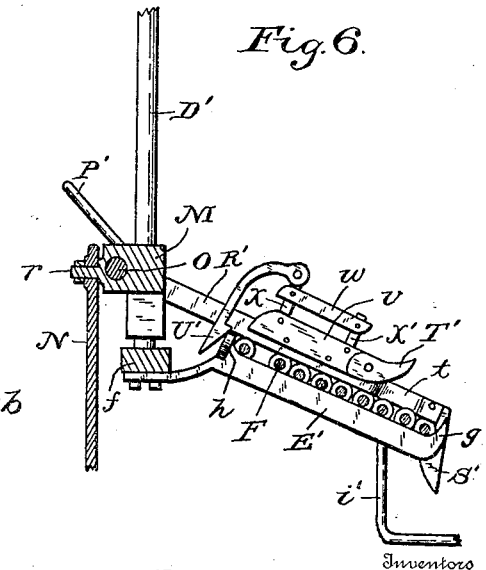

No. 823,187. PATENTED JUNE 12, 1906.
B. F. McFARLAND & C. E. CROSBY.
MECHANICAL ADVERTISER.
APPLICATION FILED AUG. 28, 1905.
4 SHEETS—SHEET 3.
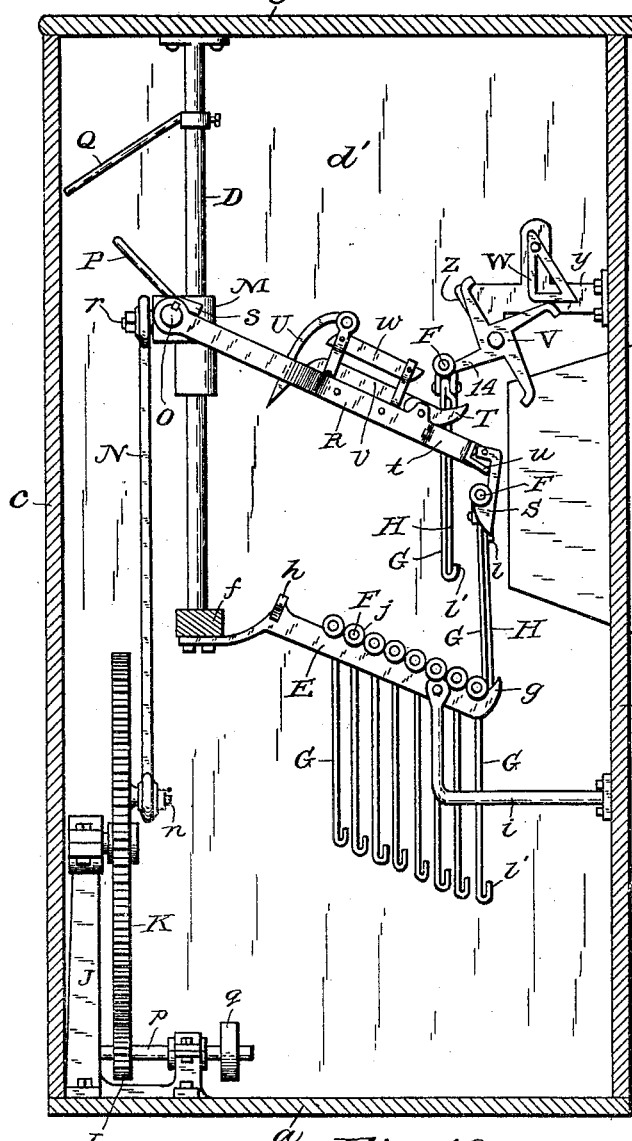
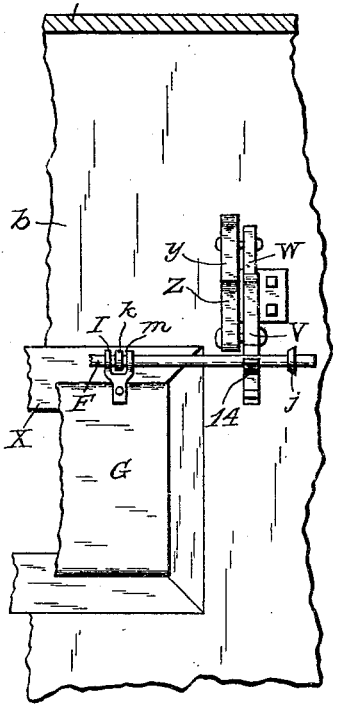
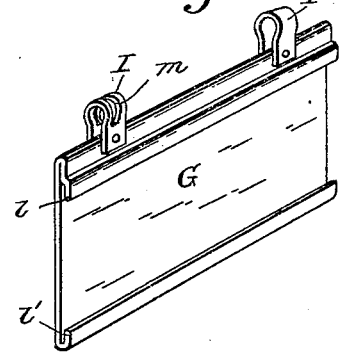
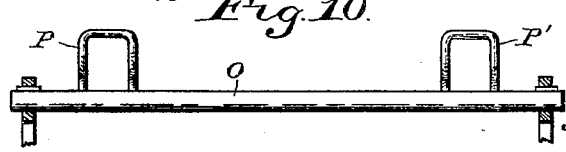

No. 823,187. PATENTED JUNE 12, 1906.
B. F. McFARLAND & C. E. CROSBY.
MECHANICAL ADVERTISER.
APPLICATION FILED AUG. 28, 1905.
4 SHEETS—SHEET 4.
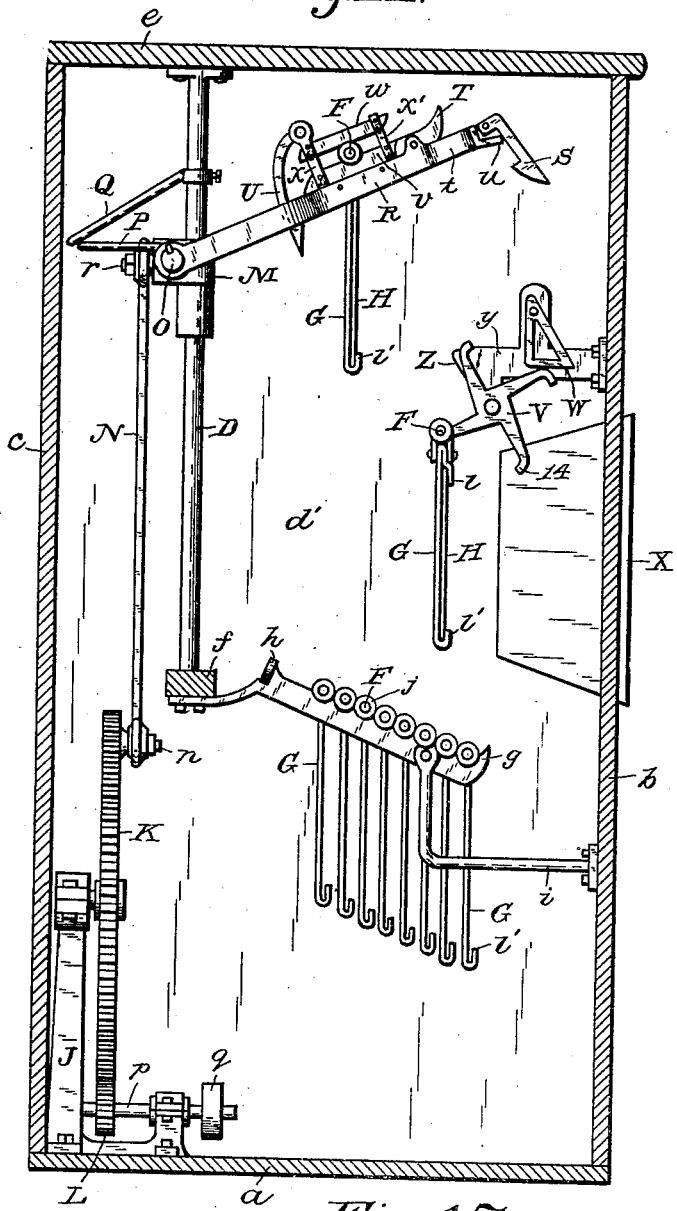
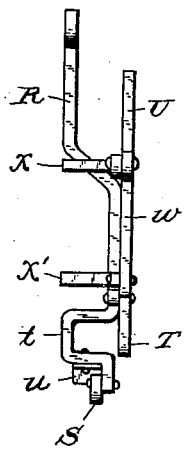
Witnesses:
B. L. Boyle.
Stella Snider.
Inventors:
B. F. McFarland,
C. E. Crosby,
by E. T. Silvius,
Attorney.

UNITED STATES PATENT OFFICE.

BENJAMIN F. McFARLAND AND CHARLES E. CROSBY, OF INDIANAPOLIS, INDIANA.

MECHANICAL ADVERTISER.

No. 823,187.

Specification of Letters Patent.

Patented June 12, 1906.

Application filed August 28, 1905. Serial No. 276,092.

*To all whom it may concern:*

Be it known that we, BENJAMIN F. MCFARLAND and CHARLES E. CROSBY, citizens of the United States, residing at Indianapolis, in the county of Marion and State of Indiana, have invented new and useful Improvements in Mechanical Advertisers; and we do declare the following to be a full, clear, and exact description of the invention, reference being had to the accompanying drawings, and to the letters and figures of reference marked thereon, which form a part of this specification.

This invention relates to mechanical apparatus for automatically displaying advertisements in succession and repeatedly or for exhibiting bulletins or pictures and for similar uses, the invention having reference particularly to mechanism that may be operated by any suitable motor for carrying to and from an opening in a cabinet special card forms of advertisements, pictures, or the like to be viewed successively.

Objects of the invention are to provide mechanical advertisers which may be constructed without the use of troublesome springs and at relatively small cost and to provide advertising apparatus which may be operated as nearly noiselessly as possible and which may be attractive, durable, and economical in use.

The invention consists in a mechanical advertiser comprising novel hanging apparatus for supporting the advertising-cards in view, holders for the cards, a card-rack for supporting the reserve holders and cards out of sight, a carrier for moving the exhibited cards from the hanging apparatus, to the card-rack and transferring other cards from the card-rack to the hanging apparatus, and means for operating the carrier. The holders for the cards comprise each a roller and a plurality of hangers for suspending a card on the roller, the hangers being so connected to the roller as to permit the roller to freely rotate when on inclined rails.

The invention consists, further, in the novel elements and the combinations and arrangements of elements, as hereinafter particularly described and claimed.

Referring to the drawings, Figure 1 is a vertical sectional view of the advertiser-cabinet, taken near the left-hand side thereof and showing the apparatus therein in side elevation; Fig. 2, a fragmentary vertical sectional view approximately on the line A A in Fig. 1, showing the mechanism in front elevation; Fig. 3, a rear elevation of a cross-head forming a part of the carrier for the advertisements; Fig. 4, a horizontal sectional view on the line B B in Fig. 1; Fig. 5, a fragmentary vertical sectional view approximately on the line C C in Fig. 4, in which the carrier is elevated partially as when descending with a card-holder after having placed a card-holder on the hanging apparatus; Fig. 6, a view similar to Fig. 5, with the difference that the carrier is shown as having descended and deposited the card-holder on the card-rack; Fig. 7, a view similar to Fig. 1, with the difference that the carrier is shown as when rising to remove a card from the hanging apparatus and to place another card thereon; Fig. 8, a fragmentary elevation showing the interior of the cabinet-front and parts supported thereby; Fig. 9, a perspective view of a card-holder; Fig. 10, a top plan of the rock-shaft of the carrier; Fig. 11, a view similar to Fig. 1, with the difference that the carrier is shown as when fully elevated and about to descend with a card to the card-rack after having placed another card on the hanging apparatus, Fig. 12, a top plan of an arm of the carrier; and Fig. 13 a plan of a card-holder roller.

Similar reference characters in the various figures of the drawings designate corresponding elements or features.

In a practical embodiment of the invention a suitable cabinet is provided comprising a bottom $a$, a front $b$, a back $c$, two sides $d$ and $d'$, and a top $e$, all connected together, and the cabinet may be provided with a door or doors, as is obvious. A pair of vertical guide-bars $D$ and $D'$ are attached to the top $e$ near the back of the cabinet, the lower ends of the guide-bars being attached to and braced by a horizontal beam $f$, that is attached to the sides $d$ and $d'$ of the cabinet.

An inclined card-rack comprises a pair of rails $E$ and $E'$, having each a stop $g$ upturned at its lowermost end and having also a striker-bar $h$, extending transversely thereof at its uppermost end, the rails being supported by the beam $f$ and also by brackets $i$ and $i'$, that are secured to the front $b$ of the cabinet.

A suitable number of rollers $F$ are provided that have each a pair of guide-flanges $j$ and $j'$ to guide the rollers on the rails of the card-rack and also on the carrier. Each roller has also a guide-collar $k$, attached thereto for guiding a card-holder G, that is supported by the roller, each card-holder having an upper lip $l$ and a lower lip $l'$ for holding a card H, on which may be placed any matter, such as an advertisement, picture, or bulletin. Each card-holder is provided at the top thereof with a hanger I, having an opening $m$ therein to receive the collar $k$ and a hanger I', both hangers extending about a roller F, by which the card-holder is suspended, the roller being free to rotate in the hangers while rolling on the card-rack rails. The reserve card-holders are supported by the rollers on the inclined card-rack, so that the rollers may carry the card-holders forwardly by the force of gravity each time a card-holder is removed from the card-rack to be placed for exhibiting the card thereon.

In the rear portion of the cabinet a stand J is mounted on which a gear-wheel K is rotatively supported that is provided with a crank-pin $n$, and a drive shaft $p$ is journaled on the stand and has a pinion L attached thereto that meshes with the gear-wheel K, a pulley $q$ being also secured to the shaft to be belted to any suitable motor that may be provided for operating the apparatus.

The card-carrier comprises a cross-head M, that is mounted movably on and guided by the guide-bars D and D' and provided at its middle portion with a wrist-pin $r$ and at its end portions with stops $s$. A connecting-rod N is pivotally connected to the crank-pin $n$ and also to the wrist-pin $r$, whereby the cross-head is operated and controlled by the gear-wheel and indirectly by means of the pulley $q$. A rock-shaft O is journaled in the cross-head M and has arms P and P' secured thereto, that are adapted to engage stops Q and Q', that are attached to the guide-bars D and D' for tilting the carrier when elevated. A pair of arms R and R' are secured to the ends of the rock-shaft O and have each an offset part $t$, near the extremity thereof, to clear the ends of the roller F, that may be on the hinging apparatus when the carrier is descending. Grappling-hooks S and S' are pivoted to the ends of the carrier-arms, the latter being provided each with a stop $u$ for limiting the movements of the hooks toward the cross-head. Each arm is provided at its forward end with a rail $v$, on which the rollers F may be carried, each rail having a tumbler T or T' pivoted to the carrier-arm and upturned at its end, and a guard-rail $u$ is supported above each rail $v$ by offset brackets $x$ and $x'$. A pair of catch-hooks U and U' are pivoted to the brackets $x$ and are adapted to receive the rollers F from the rails $v$ (one at a time) and carry them down to the card-rack.

The hanging apparatus comprises a pair of brackets $y$ and $y'$, having inclined ends Z, that are attached to the inner side of the front $b$ of the cabinet, somewhat near the top thereof, or in a plane above the card-rack. A pair of escapement-wheels V and V' are journaled on the brackets and have each a suitable number of arms 14, having curved ends for supporting the card-holders within view, the escapement-wheels being limited in their backward movements by gravity-pawls W, of which one is pivoted to each bracket, so as to engage an arm of the wheel that is mounted on the bracket, the pawl permitting the wheel to rotate in the forward direction and a short distance only in the backward direction so that the card-holders may be hung on the arms 14, that extend downwardly and rearwardly from the pivots of the wheels.

In the front $b$ of the cabinet a suitable open frame X is provided, through which the cards H may be viewed when suspended on the hanging apparatus. In the drawings it will be observed that cards H are shown on only a few of the holders G, and it will be obvious that all of the holders may be provided with the cards. Also the holders themselves may serve as mediums on which to paint or print advertising or other matter. Other minor modifications may also be made within the scope of the invention as defined by the appended claims.

In practical use the pulley $q$ is to be driven continuously at relatively slow speed, the wheel K being rotated at relatively slower speed, thus causing the card-carrier to slowly ascend and descend alternately. Assuming that the relative arrangement of the several parts are as shown in Figs. 1, 2, and 4 and the wheel K is rotated, it will be clear that the card-carrier will rise, the grappling-hooks S and S' lifting the lower and foremost roller F with the card H, as in Fig. 7, the carrier-arms straddling the card-holder that is hung opposite the frame X until the tumblers T and T' engage the roller F, that is so hung and lift it from the arms 14, the carrier advancing and drawing the other roller that is on the grappling-hooks into contact with the under sides of the arms 14, causing the escapement-wheels to turn and become locked, the ends Z of the brackets forcing the rising roller from the grappling-hooks onto the next adjacent arms 14, that rise beneath the roller and support it, as in Fig. 11, while the roller and card that have been lifted from the hanging apparatus will be elevated, as in Fig. 11, the carrier being tilted by the arms P and P', contacting with the stops Q and Q', so that the roller will roll along the rails $v$ onto the hooks U and U' against the rear ends of the rails. Then the carrier will descend and gradually become inclined in the opposite direction, as in Fig. 5, the tumblers T and T' engaging the hanging roller F, and thereby being turned upwardly as they pass the roller. When the carrier in its descent reaches the card-rack with the arms P P' against the stops s, the hooks U and U' will engage the striker-bars h, as in Fig. 6, and permit the roller F that has been carried thereby to fall onto the rails E and E' of the card-rack behind the other rollers that may be in reserve thereon, and thus with the regular movements of the mechanism each complete cycle of movement will change the advertising cards at the view-opening continuously.

Having thus described the invention, what is claimed as new is—

1. A mechanical advertiser including hanging apparatus, a plurality of display-cards, a card-rack, and a vertically-movable tilting carrier provided with swinging hooks at the outer end thereof for lifting the display-cards from the card-rack to the hanging apparatus.

2. A mechanical advertiser including hanging apparatus, a plurality of display-cards, and a vertically-movable tilting carrier provided with swinging hooks at the inner portions thereof for depositing the display-cards onto the card-rack, and means for transferring the display-cards from the hanging apparatus to the carrier.

3. A mechanical advertiser including hanging apparatus comprising a pair of escapement-wheels having arms provided with curved ends for supporting a display-card, and pawls for limiting the backward movements of the escapement-wheels; a card-rack for supporting reserve display-cards, and a carrier for moving a display-card from the arms of the escapement-wheels to the card-rack and transferring a reserve display-card from the card-rack to other arms of the escapement-wheels.

4. A mechanical advertiser including a plurality of display-cards, a card-rack, hanging apparatus comprising a plurality of movable arms for supporting a display-card, stops for the movable arms, and a tilting vertically-movable carrier provided with means for lifting a display-card from the movable arms and also provided with means for lifting a display-card from the card-rack onto the movable arms.

5. A mechanical advertiser including hanging apparatus, a display-card supported by the hanging apparatus, a card-rack, reserve display-cards supported by the card-rack, and a display-card carrier comprising a guided cross-head having a pair of arms pivoted thereto provided at the ends thereof with grappling-hooks for lifting a reserve display-card from the card-rack to the hanging apparatus, and means mounted on the carrier for moving the display-card from the hanging apparatus to the card-rack.

6. A mechanical advertiser including hanging apparatus, a display-card supported by the hanging apparatus, a card-rack, reserve display-cards supported by the card-rack, and a display-card carrier comprising a guided cross-head having a pair of arms pivoted thereto provided on the tops thereof with rails having upturned pivoted tumblers at ends thereof and catch-hooks at opposite ends thereof for moving the display-card from the hanging apparatus to the card-rack, and means mounted on the carrier for transferring a reserve display-card from the card-rack to the hanging apparatus.

7. A mechanical advertiser including rollers having guide-flanges, display-cards connected to the rollers by means of hangers loosely embracing the rollers, hanging apparatus for supporting the rollers one at a time, a card-rack having inclined rails for supporting a plurality of the rollers, and a carrier having hooks for lifting a roller to the hanging apparatus and also having hooks for carrying a roller when removed from the hanging apparatus to the card-rack.

8. A mechanical advertiser comprising hanging apparatus, a display-card supported by the hanging apparatus, a card-rack, a plurality of reserve display-cards supported by the card-rack, a pair of upright guide-bars, a cross-head guided by the guide-bars, a gear-wheel mounted rotatively and having a crank-pin connected with and controlling the cross-head, means for driving the gear-wheel, a pair of arms pivoted to the cross-head and provided with grappling-hooks for transferring the reserve display-cards to the hanging apparatus, rails having upturned pivoted tumblers mounted on the arms for removing the display-cards from the hanging apparatus, and catch-hooks mounted on the arms for receiving the display-cards from the rails and conveying them to the card-rack.

9. In exhibiting mechanism, hanging apparatus comprising a pair of brackets rigidly supported, a pair of escapement-wheels journaled on the brackets and having each a plurality of arms provided with curved ends for supporting a horizontal rod of a display-card, and means for limiting the movements of the escapement-wheels in one direction, in combination with a carrier for removing the rod from the arms and placing another rod of a display-card thereon.

10. In exhibiting mechanism, a card-rack comprising a pair of stationary inclined rails each provided with a transverse striker-bar at its uppermost end, and stops at the lowermost ends of the rails, in combination with a tilting carrier movable vertically, catch-hooks mounted movably on the carrier, and a guide for the carrier to guide the catch-hooks into engagement with the striker-bars.

11. In exhibiting mechanism, a pair of upright guide-bars, and a carrier comprising a cross-head having a rock-shaft provided with a pair of arms fixed thereto, a pair of grappling-hooks pivoted to the ends of the arms, a pair of rails mounted on the arms and provided with upturned pivoted tumblers at ends thereof, and catch-hooks at opposite ends of the rails, in combination with means for controlling the carrier, a card-rack, and hanging apparatus.

12. In exhibiting mechanism, a tilting card-carrier comprising a pair of pivoted arms having track-rails, a pair of grappling-hooks pivoted to the ends of the arms, stops for the hooks, a pair of guard-rails mounted above the track-rails of the arms, and a pair of catch-hooks mounted on the arms, in combination with means for moving the arms vertically and also pivotally, a card-rack, and hanging apparatus.

In testimony whereof we affix our signatures in presence of two witnesses.

BENJAMIN F. McFARLAND.
CHARLES E. CROSBY.

Witnesses:
WM. H. PAYNE,
E. T. SILVIUS.